US010606057B2

(12) United States Patent
Isono

(10) Patent No.: US 10,606,057 B2
(45) Date of Patent: Mar. 31, 2020

(54) MICROSCOPE SYSTEM, CONTROL METHOD AND STORAGE MEDIUM

(71) Applicant: OLYMPUS CORPORATION, Hachioji-shi, Tokyo (JP)

(72) Inventor: Kanako Isono, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 50 days.

(21) Appl. No.: 15/965,387

(22) Filed: Apr. 27, 2018

(65) Prior Publication Data

US 2018/0348494 A1 Dec. 6, 2018

(30) Foreign Application Priority Data

May 30, 2017 (JP) .................. 2017-106237

(51) Int. Cl.
*G02B 21/00* (2006.01)
*G02B 21/02* (2006.01)
*G02B 27/00* (2006.01)
*G02B 21/36* (2006.01)

(52) U.S. Cl.
CPC .......... *G02B 21/02* (2013.01); *G02B 21/365* (2013.01); *G02B 27/0068* (2013.01); *G02B 21/008* (2013.01); *G02B 21/0072* (2013.01)

(58) Field of Classification Search
CPC ............ G02B 27/0068; G02B 27/0025; G02B 21/00; G02B 21/0072; G02B 21/008; G02B 21/365; G02B 21/367
USPC .............................. 359/368, 379, 380; 348/79
See application file for complete search history.

(56) References Cited

U.S. PATENT DOCUMENTS

| 5,270,860 | A | 12/1993 | Suzuki | |
|---|---|---|---|---|
| 2011/0141260 | A1* | 6/2011 | Ouchi | G02B 7/008 348/79 |
| 2013/0063584 | A1* | 3/2013 | Nakasho | G02B 7/365 348/79 |
| 2014/0233094 | A1 | 8/2014 | Ue et al. | |
| 2017/0017070 | A1* | 1/2017 | Suzuki | G02B 27/0068 |
| 2017/0168280 | A1* | 6/2017 | Schumann | G02B 27/0025 |

FOREIGN PATENT DOCUMENTS

| JP | H05119263 A | 5/1993 |
|---|---|---|
| JP | 2014160213 A | 9/2014 |

* cited by examiner

*Primary Examiner* — Darryl J Collins
(74) *Attorney, Agent, or Firm* — Holtz, Holtz & Volek PC

(57) ABSTRACT

A microscope system includes a microscope apparatus and a controller. The microscope apparatus includes an objective and a correction device that corrects a spherical aberration. The controller, during an interval period of a time-lapse observation, detects a reference target position of an observation target and updates correction information on the basis of at least variation information, the correction information representing a relationship between a position of the objective and a setting of the correction device and the variation information representing a variation amount of a distance from the objective to the reference target position. The controller, during an observation period of the time-lapse observation, controls the correction device in accordance with the correction information for each position of the objective determined on the basis of at least the variation information.

27 Claims, 13 Drawing Sheets

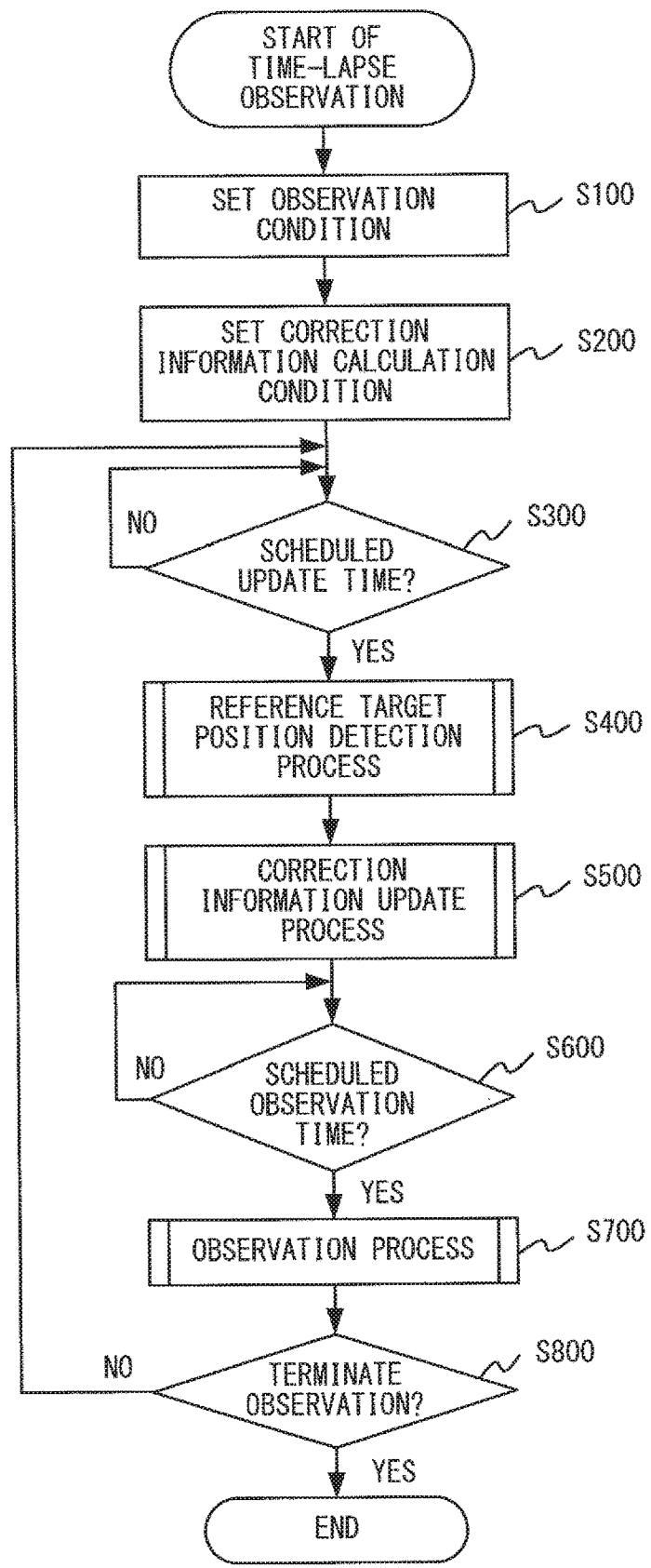
F I G. 6

MICROSCOPE SYSTEM, CONTROL METHOD AND STORAGE MEDIUM

CROSS REFERENCE TO RELATED APPLICATIONS

This application is based upon and claims the benefit of priority from prior Japanese Patent Application No. 2017-106237, filed May 30, 2017, the entire contents of which are incorporated herein by this reference.

BACKGROUND OF THE INVENTION

Field of the Invention

The disclosure of the present document is related to a microscope system, a control method and a storage medium.

Description of the Related Art

In the field of microscopy, an objective provided with a correction collar that can correct a spherical aberration caused by a thickness of the cover glass is known (see Japanese Laid-open Patent Publication No. 05-119263 for example). The correction collars of objectives have conventionally been dedicated to the correction of spherical aberrations caused by thicknesses of the cover glasses. However, in recent years, when methods of observing deep portions of samples are widespread, they are used also for correcting spherical aberrations that change depending upon the depths of the observation target planes (see Japanese Laid-open Patent Publication No. 2014-160213 for example).

Japanese Laid-open Patent Publication No. 2014-160213 discloses a technique in which a relationship between a relative position of the objective with respect to the sample and a set value of the correction collar with which the spherical aberration is corrected is calculated before starting the observation and the correction collar is controlled on the basis of the relationship during the observation.

SUMMARY OF THE INVENTION

A microscope system according to an aspect of the present invention includes a microscope apparatus including an objective and a correction device that corrects a spherical aberration, and also includes a controller that controls the microscope apparatus. The controller, during an interval period of a time-lapse observation, detects a reference target position of an observation target, and updates correction information on the basis of at least variation information, the correction information representing a relationship between a position of the objective and a setting of the correction device and the variation information representing a variation amount of a distance from the objective to the reference target position, and the controller, during an observation period of the time-lapse observation, controls the correction device in accordance with the correction information for each position of the objective determined on the basis of at least the variation information.

A control method according to an aspect of the present invention includes, during an interval period of a time-lapse observation, detecting a reference target position of an observation target; and updating correction information on the basis of at least variation information, the correction information representing a relationship between a position of the objective and a setting of a correction device that corrects a spherical aberration and the variation information representing a variation amount of a distance from the objective to the reference target position, and, during an observation period of the time-lapse observation, controlling the correction device for each position of the objective on the basis of at least the variation information and the correction information.

A storage medium according to an aspect of the present invention is a non-transitory storage medium having stored therein a program for causing a controller for controlling a microscope apparatus to execute a process including, during an interval period of a time-lapse observation, detecting a reference target position of an observation target; and updating correction information on the basis of at least variation information, the correction information representing a relationship between a position of the objective and a setting of a correction device that corrects a spherical aberration and the variation information representing a variation amount of a distance from the objective to the reference target position, and, during an observation period of the time-lapse observation, controlling the correction device for each position of the objective on the basis of at least the variation information and the correction information.

BRIEF DESCRIPTION OF THE DRAWINGS

The present invention will be more apparent from the following detailed description when the accompanying drawings are referenced.

FIG. 6 is a flowchart illustrating an example of a time-lapse observation;

DESCRIPTION OF THE EMBODIMENTS

Time-lapse observation is known as an observation method that uses a microscope. Time-lapse observation often continues for a long period of time. This sometimes leads to a situation in which the state of the sample (such as the size, composition, etc. for example) changes during the period of a time-lapse observation. In such a case, a situation may occur in which spherical aberrations are not corrected sufficiently even when the correction collar is controlled on the basis of a relationship calculated before the start of the time-lapse observation.

Hereinafter, explanations will be given for the embodiments of the present invention.

Figure 1:
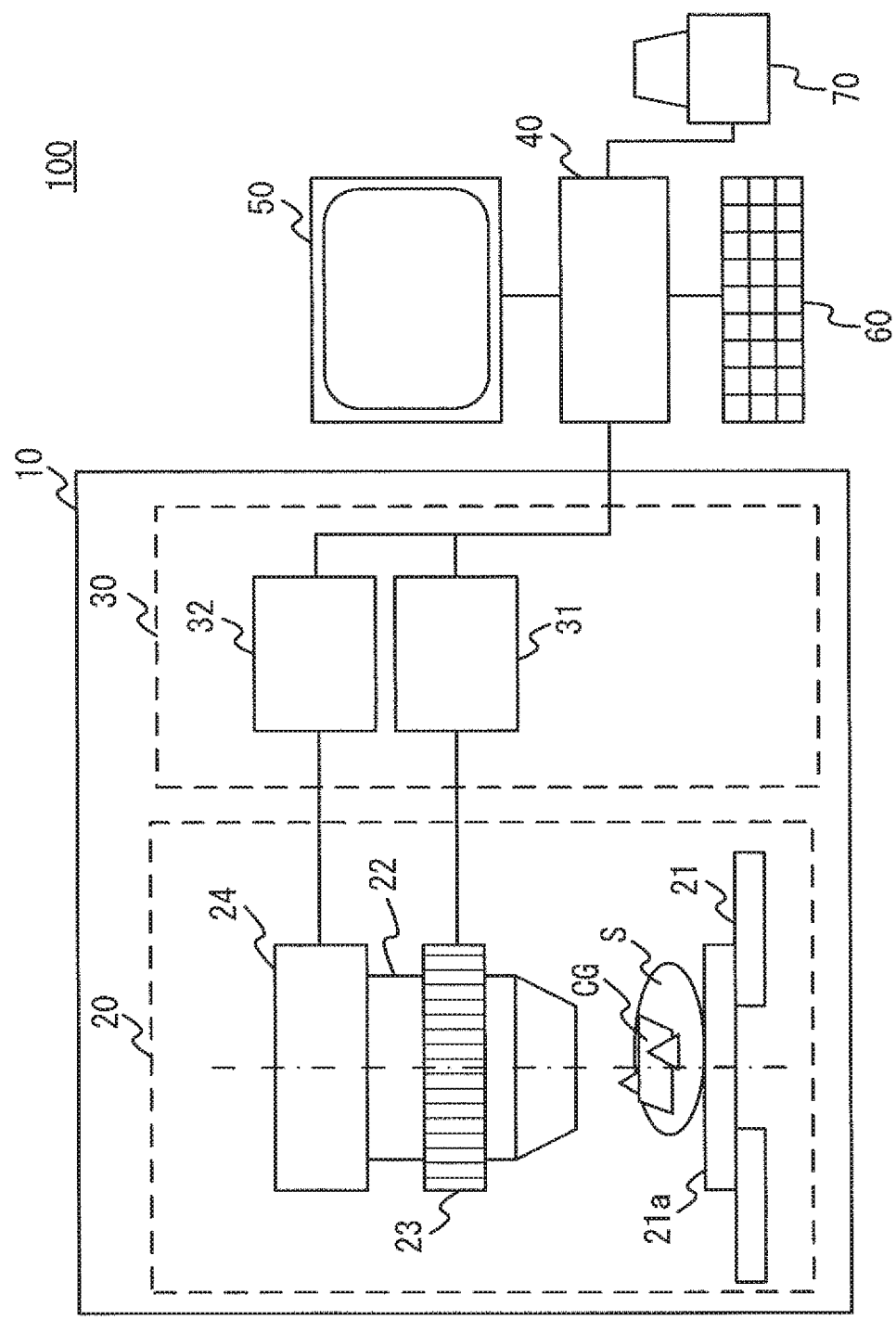
FIG. 1 exemplifies a configuration of a microscope system 100.
Figure 2:
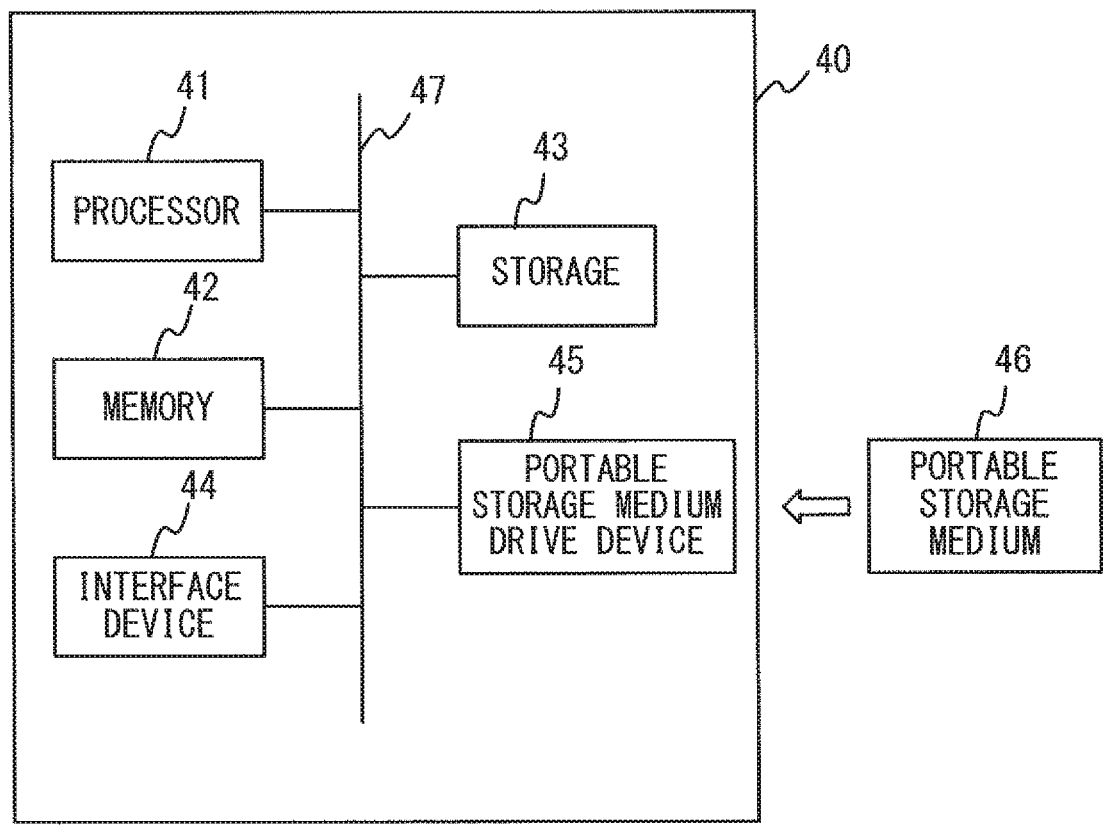
FIG. 2 exemplifies a configuration of a controller 40.
Figure 3:
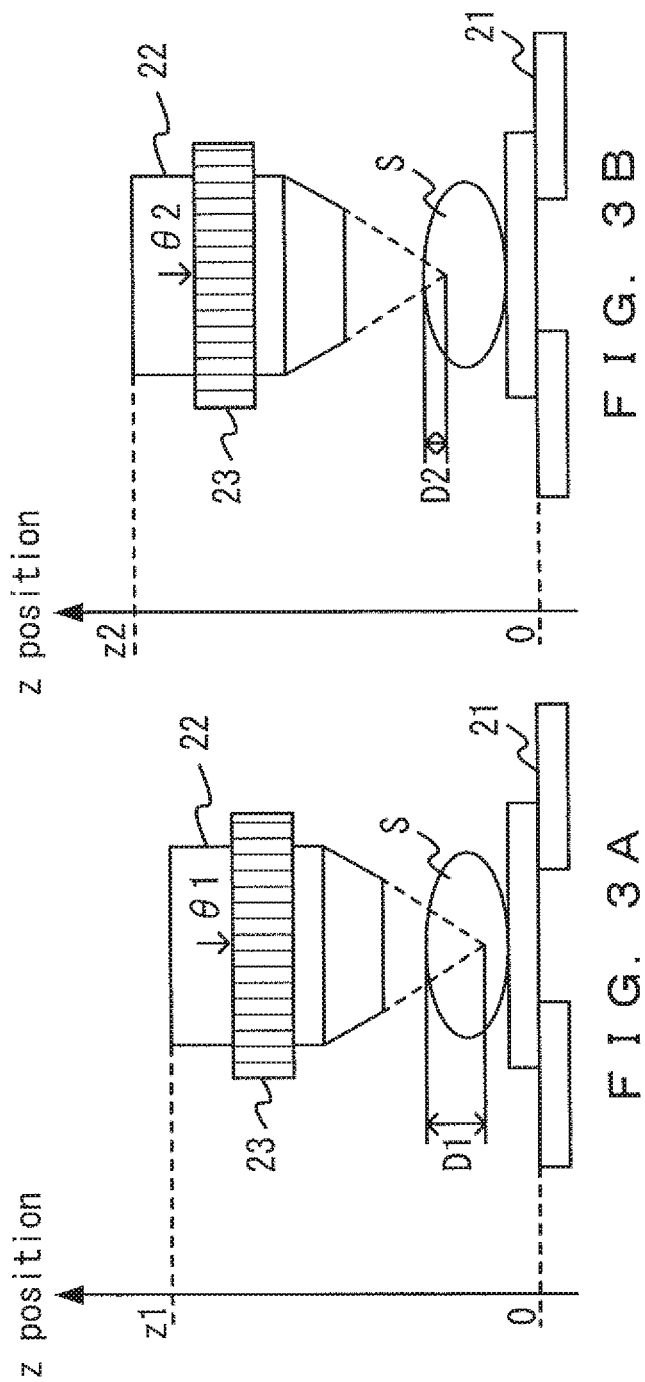
FIG. 3A and FIG. 3B are figures explaining relationships between the positions of an objective 22 and the settings of a correction collar 23.
Figure 4:
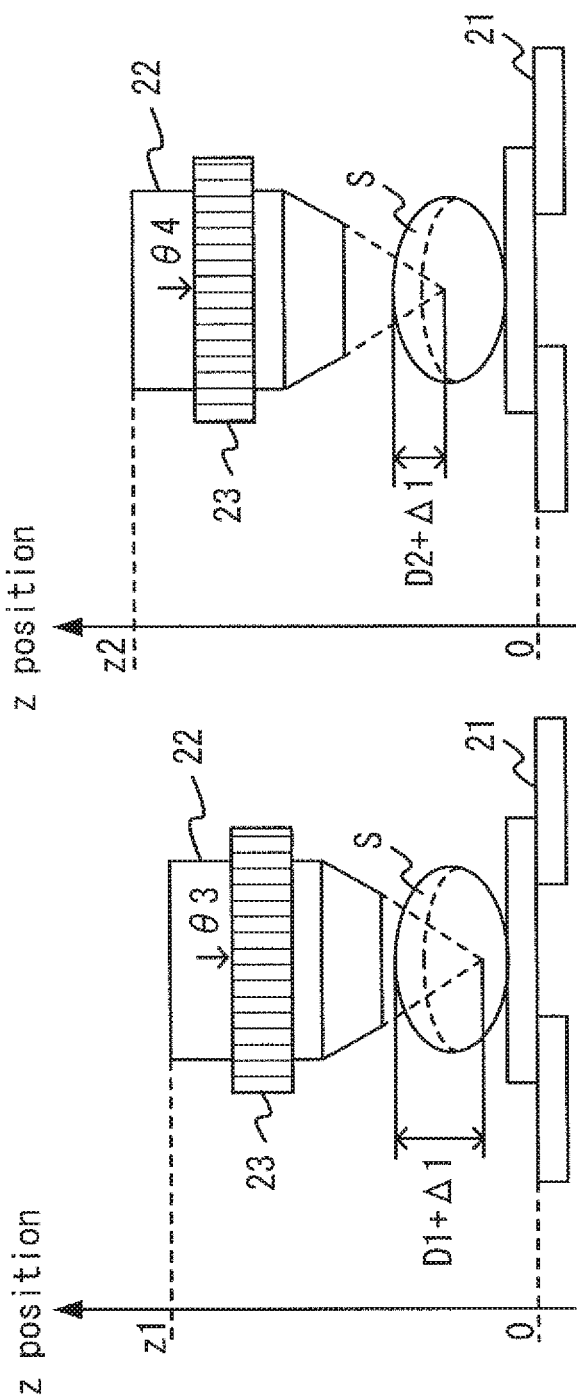
FIG. 4A and FIG. 4B are other figures explaining relationships between the positions of the objective 22 and the settings of the correction collar 23.
Figure 5:
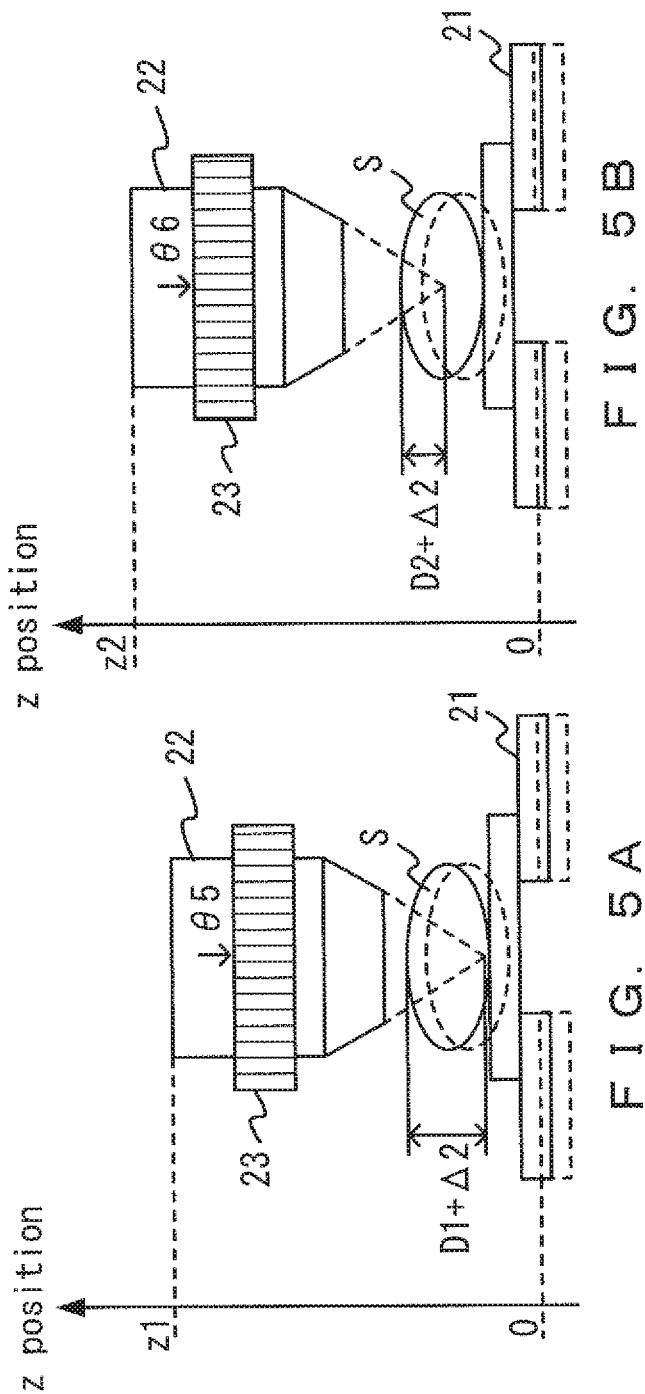
FIG. 5A and FIG. 5B are still other figures explaining relationships between the positions of the objective 22 and the settings of the correction collar 23.

FIG. 1 exemplifies a configuration of a microscope system 100 according to one embodiment. FIG. 2 exemplifies a configuration of a controller 40 included in the microscope system 100. The microscope system 100 illustrated in FIG. 1 includes a microscope apparatus 10, the controller 40 that controls the microscope apparatus 10, a display device 50 and a plurality of input devices (a keyboard 60 and a revolver manipulation device 70) that input instructions to the controller 40.

The microscope apparatus 10 is for example a two-photon excitation fluorescence microscope apparatus. Also, the microscope apparatus 10 may be a confocal microscope apparatus, a light-sheet microscope apparatus, a light-field microscope apparatus, etc. The microscope apparatus 10 includes a microscope 20, and a drive device 30 that drives respective units of the microscope 20. Note that while FIG. 1 illustrates the microscope 20 and the drive device 30 as separate units, the microscope 20 and the drive device 30 may be configured in an integrated configuration.

The microscope 20 includes a stage 21, an objective 22 having a correction collar 23, and a revolver 24 provided with the objective 22. The correction collar 23 is an example of a correction device that corrects spherical aberrations. The correction collar 23 moves a lens in the objective 22 to a position in accordance with the setting. Sample S, which is the observation target, is mounted on the stage 21. In more detail, a sample stand 21a is mounted on the stage 21, and sample S having its upper surface covered with cover glass CG is mounted on the sample stand 21a. Sample S is for example a biological sample such as the brain of a mouse. Note that the setting of the correction collar 23 is for example the rotation angle of the correction collar 23 from the reference position.

The drive device 30 includes a correction collar drive device 31 and an focusing device 32. The correction collar drive device 31 is a device that drives the correction collar 23 in accordance with an instruction from the controller 40, and is also a device that changes the setting of the correction collar 23. The focusing device 32 is a device that moves the revolver 24 in the optical axis directions of the objective 22 in accordance with an instruction from the controller 40. The focusing device 32 changes the position of the objective 22 by moving the revolver 24 in the optical axis directions.

The controller 40 is for example a standard computer. As shown in FIG. 2, the controller 40 includes a processor 41, a memory 42, a storage 43, an interface device 44 and a portable storage medium drive device 45, into which a portable storage medium 46 is inserted. These elements are connected to each other via a bus 47.

The processor 41 is for example a CPU (Central Processing Unit), an MPU (Micro Processing Unit), a DSP (Digital Signal Processor) etc., and executes a program in order to perform the programmed processes. The memory 42 is for example a RAM (Random Access Memory), and temporarily stores a program or data stored in the storage 43 or the portable storage medium 46, when the program is to be executed.

The storage 43 is for example a hard disk or a flash memory, and is used mainly for storing various types of data or programs. The interface device 44 is a circuit that exchanges signals with a device other than the controller 40 (such as the microscope apparatus 10, the display device 50, the keyboard 60, the revolver manipulation device 70, etc.). The portable storage medium drive device 45 accommodates the portable storage medium 46 such as an optical disk, a compact flash (registered trademark), etc. The portable storage medium 46 has a function as an auxiliary for the storage 43. The storage 43 and the portable storage medium 46 are examples of non-transitory computer readable storage media that have stored a program.

The configuration illustrated in FIG. 2 is an example of the hardware configuration of the controller 40, and the controller 40 is not limited to this configuration. The controller 40 may be a dedicated device instead of a general-purpose device. The controller 40 may include an electric circuit such as an ASIC (Application Specific Integrated Circuit), an FPGA (Field Programmable Gate Array), etc., instead of or in addition to the processor that executes programs, and such an electric circuit may perform the processes that are described later.

The display device 50 is for example a display device such as a liquid crystal display device, an organic electro-luminescence (OEL) display device, a CRT display device, etc. Note that the display device 50 may include a touch panel sensor, and in such a case, the display device 50 functions also as an input device.

The revolver manipulation device 70 is an input device through which the user of the microscope system 100 specifies the position of the observation target plane. By the user using the revolver manipulation device 70 to input, to the controller 40, an instruction to change the position of the observation target plane, the controller 40 makes the focusing device 32 move the revolver 24 in the optical axis directions. Thereby, the objective 22 moves in the optical axis directions so that the position of the observation target plane is changed. Note that the observation target plane is a plane which is orthogonal to the optical axis of the objective 22 and on which an image is obtained by the microscope apparatus 10 in the observation process, which will be described later. The observation target plane is for example the focal plane of the objective 22 during the obtainment of an image. The position of the observation target plane may also be referred to as an observation target position.

FIG. 3A through FIG. 5B explain relationships between the positions of the objective 22 and the settings of the correction collar 23. Note that cover glass CG is omitted in FIG. 3A through FIG. 5B.

As illustrated in FIG. 3A and FIG. 3B, the depth of the observation target plane changes depending upon the position of the objective 22 in the microscope system 100. The position of the objective 22 (which will also be referred to as a z position hereinafter) is the position of the objective 22 in the optical axis directions. In more detail, the position of the objective 22 is a relative position of the objective 22 with respect to the setting position of the stage 21. The depth of the observation target plane is a distance, in the optical axis directions of the objective 22, from the surface of sample S to the observation target plane. FIG. 3A and FIG. 3B illustrate that the depth of the observation target plane is D1 when the z position is z1 while the depth of the observation target plane is D2 when the z position is z2.

A change of the depth of the observation target plane causes a change in the distributions of refractive indexes of the medium existing between the objective 22 and the observation target plane. In the example illustrated in FIG. 3A and FIG. 3B for example, the ratio between region of the air and region of sample S existing between the objective 22 and the observation target plane changes. This causes a change in the distributions of refractive indexes. Therefore, a change of the depth of the observation target plane also causes a change in the amount of spherical aberration occurring in the microscope 20.

Accordingly, the settings of the correction collar 23 that can correct spherical aberrations usually vary depending upon the positions of the objective 22. FIG. 3A and FIG. 3B illustrate that while the setting of the correction collar 23 that can correct spherical aberrations is θ1 when the z position is z1 while the setting of the correction collar 23 that can correct spherical aberrations is θ2 when the z position is z2.

In view of this, in the microscope system 100, the controller 40 beforehand generates correction information representing a relationship, that can correct spherical aberrations, between the position of the objective 22 and a setting of the correction collar 23. Then, the controller 40 controls the correction collar 23 for each position of the objective 22 by using the generated correction information. Thereby spherical aberrations can be corrected regardless of the positions of the objective 22. This makes it possible to obtain satisfactory images regardless of the depths of the observation target plane.

Incidentally, changes over time may sometimes occur in sample S or the microscope apparatus 10 during the period of a time-lapse observation. FIG. 4A and FIG. 4B illustrate the expansion of sample S caused by a change over time that occurred in sample S. FIG. 5A and FIG. 5B illustrate a situation in which heat applied during the period of a time-lapse observation has changed the position of the stage 21 in the optical axis directions.

As illustrated in FIG. 4A and FIG. 4B, the expansion of sample S changes the distance between the surface of sample S and the objective 22. This causes a change in the observation depth even when the position of the objective 22 has not been changed. FIG. 4A illustrates a situation in which the expansion of sample S has changed the observation depth from D1 to D1+Δ1 when the z position is z1 and that change has also changed the setting of the correction collar 23, that can correct spherical aberrations, from θ1 to θ3. FIG. 4B illustrates a situation in which the expansion of sample S has changed the observation depth from D2 to D2+Δ1 when the z position is z2 and that change has also changed the setting of the correction collar 23, that can correct spherical aberrations, from θ2 to θ4.

As illustrated in FIG. 5A and FIG. 5B, a change of the position of the stage 21 causes a change of the position of sample S. This also changes the distance between the surface of sample S and the objective 22. This causes a change in the observation depth even when the position of the objective 22 has not been changed. FIG. 5A illustrates a situation in which a change of the position of the stage 21 has changed the observation depth from D1 to D1+Δ2 when the z position is z1 and that change has also changed the setting of the correction collar 23, that can correct spherical aberrations, from θ1 to θ5. FIG. 5B illustrates a situation in which a change of the position of the stage 21 has changed the observation depth from D2 to D2+Δ2 when the z position is z2 and that change has also changed the setting of the correction collar 23, that can correct spherical aberrations, from θ2 to θ6.

As indicated by the comparisons between FIGS. 3A and 3B and FIGS. 4A and 4B, a change in the state of sample S changes a relationship, that can correct spherical aberrations, between the position of the objective 22 and a setting of the correction collar 23. Note that FIG. 4A and FIG. 4B illustrate an example in which the shape or size of sample S changes as an example of a change in the state of sample S. However, the above relationship changes similarly due to a change in the state of sample S such as in a case when the distributions of refractive indexes of sample S change due to a change in the composition or temperature of sample S. Also, as indicated by the comparisons between FIGS. 3A and 3B and FIGS. 5A and 5B, a change in the state of the microscope apparatus 10 changes a relationship, that can correct spherical aberrations, between the position of the objective 22 and a setting of the correction collar 23. Accordingly, when correction information generated before the start of a time-lapse observation continues to be used during the period of the time-lapse observation in which the above changes may occur, it is sometimes impossible to correct spherical aberrations sufficiently.

In view of this, in the microscope system 100, the controller 40 updates correction information during an interval period of a time-lapse observation. In more detail, the controller 40 detects a reference target position of sample S during an interval period and updates correction information on the basis of at least variation information, which represents a variation amount of the distance from the objective 22 to the reference target position.

The interval period used herein is a period that is during the period of a time-lapse observation and that is between two observation periods separate in time. The period of a time-lapse observation includes observation periods and interval periods. Also, the reference target position of sample S is a position serving as a reference of the depth of the observation target plane. Specifically, the reference target position of sample S is the position of the interface that is closest to the objective 22 from among the interfaces of sample S. When cover glass CG is used, the reference target position is the position of the interface between sample S and cover glass CG.

Further, the controller 40 controls the correction collar 23 for each position of the objective 22 on the basis of at least variation information and correction information during an observation process of a time-lapse observation. In more detail, the controller 40 controls the correction collar 23 in accordance with correction information for each position of the objective that is determined on the basis of at least variation information.

The microscope system 100 makes it possible to correct spherical aberrations by performing the above processes even when a change over time has occurred in sample S or the microscope apparatus 10. Accordingly, even in time-lapse observations, satisfactory images can be obtained by correcting spherical aberrations.

Figure 7:
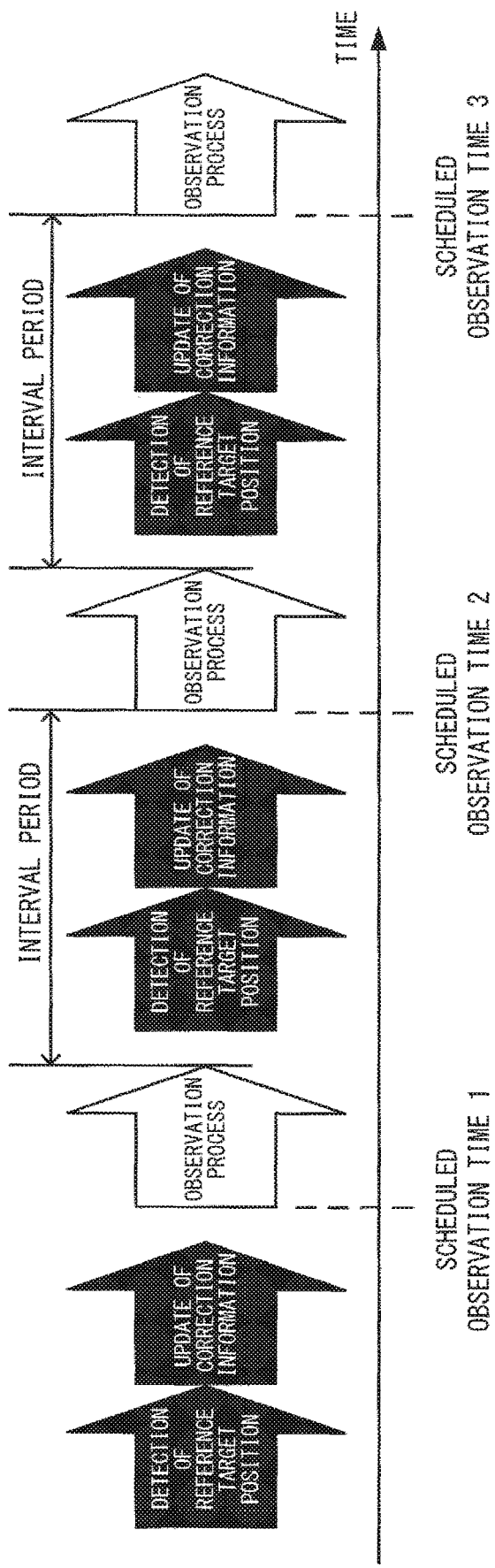
FIG. 7 illustrates the timings of the respective processes performed in a time-lapse observation.

FIG. 6 is a flowchart illustrating an example of a time-lapse observation. FIG. 7 illustrates the timings of the respective processes performed in a time-lapse observation. Hereinafter, by referring to FIG. 6 and FIG. 7, specific explanations will be given for the processes performed by the controller 40 of the microscope system 100 during the period of a time-lapse observation.

The process illustrated in FIG. 6 is started by for example the processor 41 of the controller 40 loading a program recorded in the storage 43 or the portable storage medium 46 into the memory 42 and executing it.

First, the controller 40 sets an observation condition (step S100). In this process, the controller 40 sets an observation condition in accordance with information input by the user through an input device. Note that setting an observation condition is for example storing the observation condition in a storage unit, such as the memory 42, the storage 43, etc., separately from other pieces of information so that the observation condition can be read at an arbitrary timing during the period of time-lapse observation.

An observation condition set in step S100 may be for example an observation target scope, an observation position, the number of times of scanning, the length of an interval, etc., although the scope of the present invention is not limited to these examples. The observation target scope is a scope of a region (xy region) that is captured as an image on the observation target plane. An observation target scope may be set through the controller 40 by for example the user inputting information specifying the objective to be used for the observation (the objective 22 in this example) and the position of the stage 21 with respect to the directions (xy directions) orthogonal to the optical axis of the objective. Also, an observation position is a position of the objective 22 corresponding to the observation target plane. An observation position may be set by for example the user specifying one or more observation target plane or by the user specifying the upper and lower limits of observation target planes and the interval between the observation target planes. The number of times of scanning is the number of times of conducting observation processes repeatedly during the period of a time-lapse observation, i.e., the number of the observation processes. The length of an interval is a length in time of an interval period.

Next, the controller 40 sets a correction information calculation condition (step S200). In this process, the controller 40 sets a correction information calculation condition in accordance with information input by the user through an input device. Note that setting a correction information calculation condition is for example storing a correction information calculation condition in a storage unit, such as the memory 42, the storage 43, etc., separately from other pieces of information so that the correction information calculation condition can be read at an arbitrary timing during the period of a time-lapse observation.

A correction information calculation condition set in step S200 may be for example a calculation method of correction information, a correction information determination position, etc., although the scope of the present invention is not limited to these examples. As a calculation method of correction information, there are a method in which the existing correction information is converted and a method in which correction information is generated newly, as will be described later. A correction information determination position is the position of the objective 22 when an image used for generating correction information is obtained. A correction information determination position is set by for example the user specifying a plurality of such positions. Note that it is sufficient if a correction information determination position is determined in such a manner that a plane on which an image is obtained by the microscope apparatus 10 with the objective 22 at the correction information determination position (this position of the plane will be referred to as a correction information determination target position hereinafter) is located in sample S. A correction information determination position may be identical to an observation position or may be different from it.

When an observation condition and a correction information calculation condition are set, the controller 40 checks whether a scheduled update time has arrived. Note that scheduled update time is time that is earlier than a next scheduled observation time by at least a period of time taken by the processes in step S400 and step S500, the next scheduled observation time being calculated on the basis of the length of an interval set in step S100 and the processes in step S400 and step S500 being explained later. Hereinafter, explanations will be given on an assumption that the scheduled observation time and the scheduled update time are calculated in advance in step S100 and are stored in a storage unit together with the observation condition and the correction information calculation condition.

When the scheduled update time arrives, the controller 40 performs a reference target position detection process (step S400), in which the reference target position of sample S is detected, and thereafter performs a correction information update process (step S500), in which the correction information is updated by using the reference target position detected in step S400. Note that the reference target position detection process and the correction information update process will be described later in detail.

When the correction information is updated, the controller 40 checks whether the scheduled observation time has arrived (step S600), and performs an observation process when the scheduled observation time arrives (step S700). In the observation process, the controller 40 controls the correction collar 23 for each position of the objective 22. Note that the observation process will be described later in detail.

Thereafter, the controller 40 determines whether to terminate the time-lapse observation (step S800). In this process, the controller 40 terminates the time-lapse observation when the number of the observation processes that have been conducted has reached the number of times of scanning set in step S100. When the number of the observation processes that have been conducted has not reached the number of times of scanning, the controller 40 does not terminate the time-lapse observation but repeats the processes from step S300 through step S800 until the number of the observation processes reaches the number of times of scanning.

Through the above processes, the correction information is updated during the interval periods in a time-lapse observation using the microscope system 100 as illustrated in FIG. 7. This makes it possible to obtain a satisfactory image in an observation process that is conducted at scheduled time.

Hereinafter, more detailed explanations will be given for a reference target position detection process, a correction information update process and an observation process that are conducted by the controller 40 during the period of a time-lapse observation.

Figure 8:
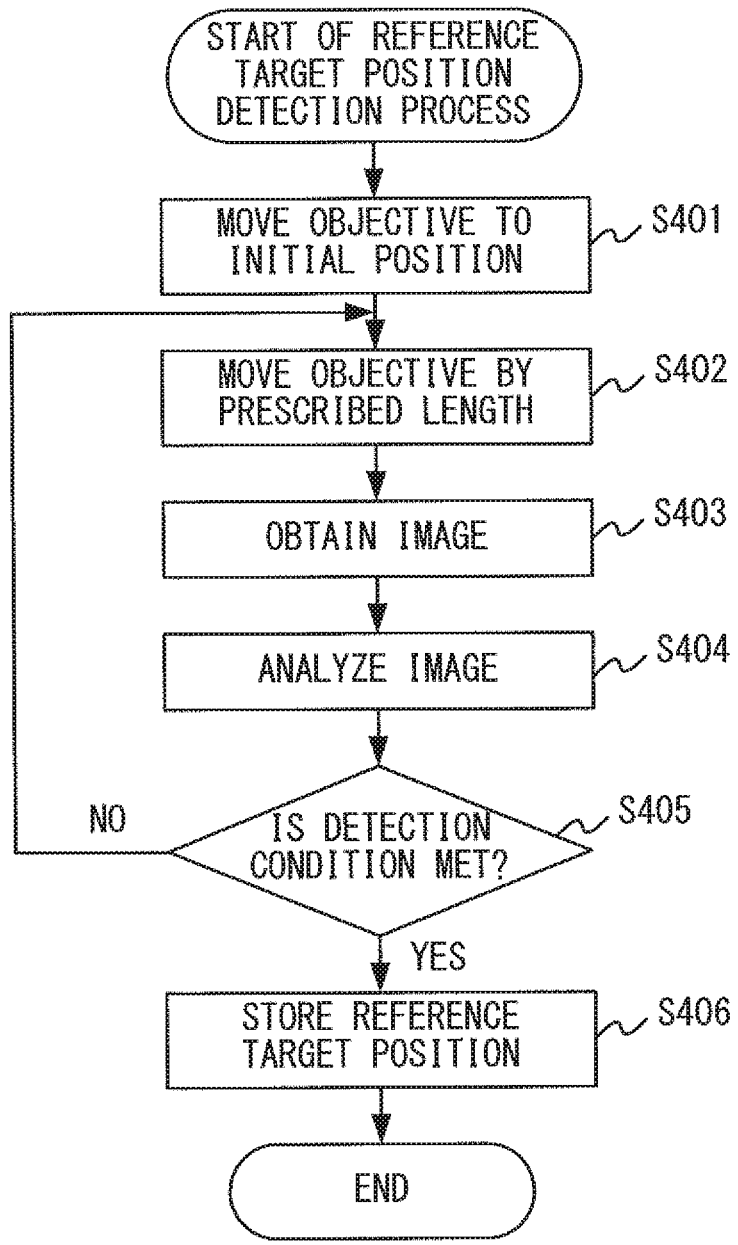
FIG. 8 is a flowchart illustrating an example of a reference target position detection process.

FIG. 8 is a flowchart illustrating an example of a reference target position detection process. When the reference target position detection process is started, the controller 40 first moves the objective 22 to the initial position (step S401) as illustrated in FIG. 8. In this process, the controller 40 makes the focusing device 32 move the objective 22 to the initial position. Note that any position can be the initial position if the position causes the focal plane of the objective 22 to be between sample S and the objective 22.

Next, the controller 40 moves the objective 22 by a prescribed length (step S402). In this process, the controller 40 makes the focusing device 32 move the objective 22 in the direction of approaching sample S by a prescribed length.

Further, the controller 40 instructs the microscope apparatus 10 to obtain an image (step S403). Thereafter, the controller 40 analyzes (step S404) the image (which will be referred to as a first image hereafter) that was obtained by the microscope apparatus 10 in accordance with the instruction of step S403. In this process, the controller 40 calculates for example the proportion of pixels, having luminance higher than a prescribed value, included in the first image (which will simply be referred to as the proportion of pixels hereinafter), or in other words, the ratio of the number of pixels having luminance higher than a prescribed value to the number of the pixels that constitute the first image.

Upon the termination of the image analysis, the controller 40 determines whether the analyzed first image meets a detection condition (step S405). The detection condition is a condition for determining that a first image is an image obtained by capturing sample S, and is for example a threshold (such as 50% for example) of the proportion of pixels described above. In this example, pixels corresponding to sample S have luminance higher than that of pixels corresponding to substances (for example air etc.) other than sample S. Utilizing this fact, when the proportion of pixels is equal to or higher than a threshold, the controller 40 determines that the detection condition is met.

When determining that the detection condition is not met, the controller 40 repeats the processes from step S402 through step S405 until it determines that the detection condition is met. When determining that the detection condition is met, the controller 40 stores the reference target position of sample S (step S406) and terminates the reference target position detection process. In this process, the position of the focal plane of the objective 22 at the moment when the detection condition was met is stored as the reference target position.

In step S406, variation information, which represents the variation amount of the distance from the objective 22 to the reference target position, may be generated so as to be stored together with the reference target position. The above variation amount can be calculated as a distance from the reference target position that was detected at the previous time to the reference target position that is detected at the current time. It is noted that the variation amount is calculated as zero in the first reference target position detection process.

As described above, in the reference target position detection process illustrated in FIG. 8 performed during an interval period, the controller 40 controls the microscope apparatus 10 (step S402 and step S403) so that the microscope apparatus 10 obtains a plurality of first images in a plurality states with different positions of the objective 22. Further, the controller 40 detects the reference target position of sample S (from step S404 through step S406) on the basis of at least a plurality of first images obtained by the microscope apparatus 10. More specifically, the controller 40 detects the reference target position of sample S on the basis of at least the proportion of the pixels having luminance higher than a prescribed value, the proportion being calculated for each of the plurality of first images.

Note that in the reference target position detection process illustrated in FIG. 8, the smaller the prescribed length of step S402 is, the higher the accuracy is for detecting the reference target position. On the other hand, the smaller the prescribed length is, the greater the number of times of obtaining images is in a reference target position detection process. This leads to a longer time taken for detecting the reference target position. Thus, it is desirable to determine the prescribed length in step S402 while taking the balance between the detection accuracy and the process time into consideration.

Figure 9:
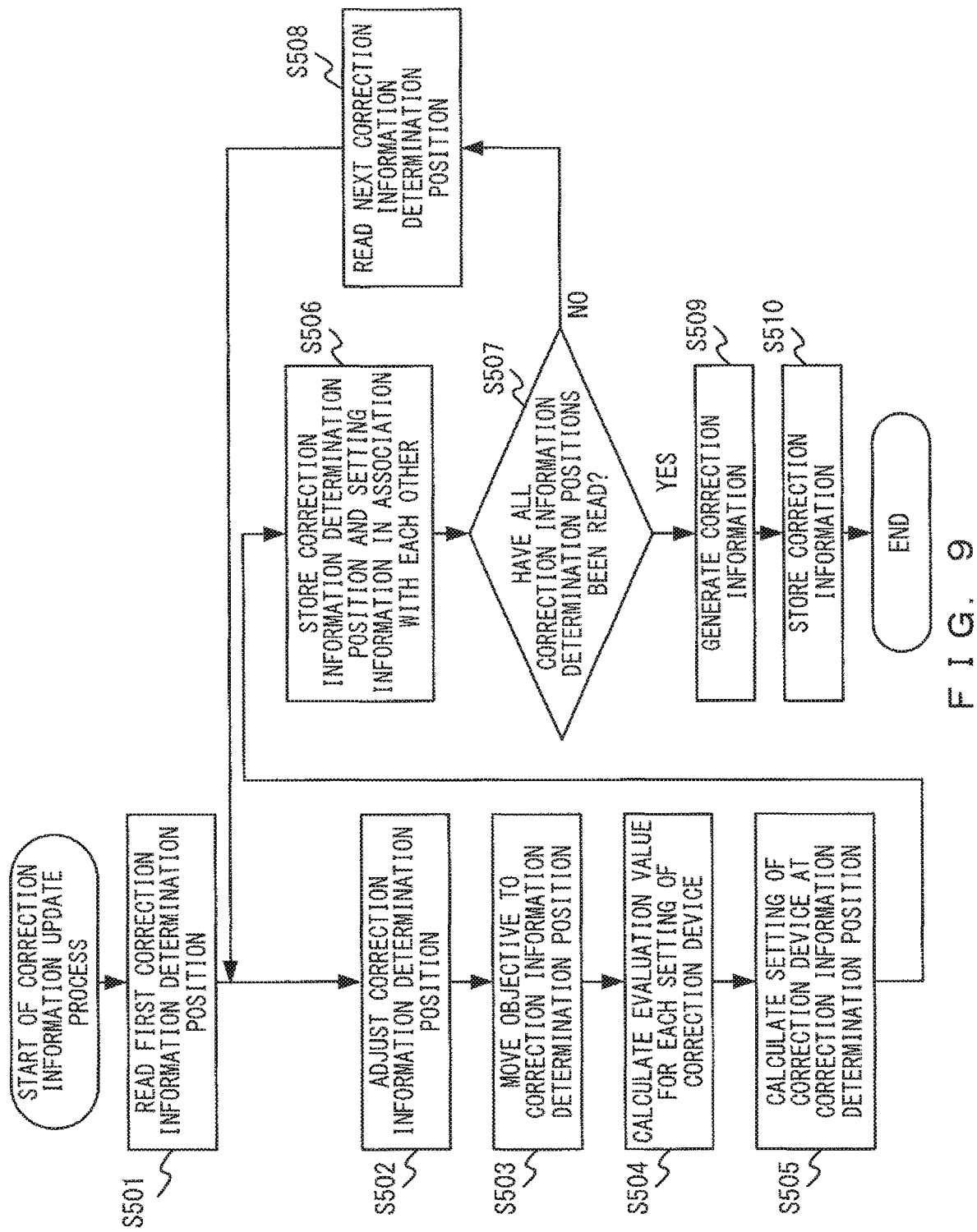
FIG. 9 is a flowchart illustrating an example of a correction information update process.

FIG. 9 is a flowchart illustrating an example of a correction information update process. When the correction information update process is started, the controller 40 first reads the first correction information determination position as illustrated in FIG. 9 (step S501). In this process, the controller 40 reads one of the correction information determination positions set as the correction information calculation condition set in step S200 in FIG. 6.

Next, the controller 40 adjusts the correction information determination position (step S502). In this process, the controller 40 adjusts the correction information determination position on the basis of at least the variation information calculated in step S406, specifically by the variation amount represented by the variation information. Then, the controller 40 stores the adjusted correction information determination position in the storage unit. When the variation amount is positive, i.e., when the reference target position has moved in the positive direction, the adjustment is conducted by changing the correction information determination position in the positive direction as well.

Further, the controller 40 moves the objective 22 to the correction information determination position (step S503). In this process, the controller 40 makes the focusing device 32 move the objective 22 to the correction information determination position adjusted in step S502.

Thereafter, the controller 40 calculates an evaluation value for each setting of a correction device (step S504). In this process, the controller 40 first outputs, to the microscope apparatus 10 repeatedly, a setting change instruction to change the setting of the correction collar 23 and an image obtainment instruction to obtain an image. Specifically, the controller 40 controls the microscope apparatus 10 so that a plurality of images are obtained in a plurality of states with different settings of the correction collar 23 (each of such images will be referred to as a second image hereinafter). Thereafter, when receiving a plurality of second images obtained in different states with different settings of the correction collar 23 from the microscope apparatus 10, the controller 40 calculates an evaluation value for each of the plurality of second images. Any value can be used as an evaluation value if the value is correlated with a spherical aberration, and an example of an evaluation value is a contrast value that becomes greater in response to the level of correction conducted on a spherical aberration. Note that it is desirable that a contrast value be not calculated from a particular region in an image but be calculated for the entire image.

When an evaluation value has been calculated for each second image, the controller 40 calculates the setting of the correction device in the correction information determination position (step S505). In this step, the controller 40 calculates the setting of the correction collar 23 on the basis of at least a plurality of evaluation values calculated in step S504. When a contrast value serves as an evaluation value, it can be determined that the higher the contrast value is, the better the spherical aberration has been corrected. Thus, the controller 40 identifies for example an image for which the highest evaluation value has been calculated from among the plurality of evaluation values. Also, the controller 40 may identify the setting of the correction collar 23 at the moment when the identified image was obtained, as the setting of the correction collar 23 that can correct a spherical aberration at the correction information determination position (which will simply be referred to as the setting of the correction collar 23 at the correction information determination position). Also, the controller 40 may estimate, through function approximation using a plurality of evaluation values, the setting of the correction collar 23 that leads to the highest evaluation value so as to identify the estimated setting of the correction collar 23 as the setting of the correction collar 23 at the correction information determination position.

Thereafter, the controller 40 stores the correction information determination position and the setting information in association with each other (step S506). In this process, the controller 40 stores the correction information determination position read in step S501 and the information (setting information) on the setting of the correction collar 23 calculated in step S505 in association with each other in the storage unit.

Further, the controller 40 determines whether all the correction information determination positions stored in the storage unit have been read (step S507). When not all the positions have been read, the controller 40 reads the next correction information determination position (step S508), and repeats the processes from step S502 through step S507.

When determining in step S507 that all the correction information determination positions have been read, the controller 40 generates correction information (step S509), stores it in the storage unit (step S510), and thereafter terminates the correction information update process. In this process, the controller 40 generates and stores correction information on the basis of the plurality of correction information determination positions stored in step S506 and a plurality of pieces of setting information associated to these correction information determination positions. Specifically, the controller 40 performs for example an interpolation process or a function approximation process on a plurality of combinations between correction information determination positions and setting information, and calculates a function of the position (z) of the objective 22 and the setting ($\theta$) of the correction collar 23. Then, the controller 40 stores the calculated function as correction information in the storage unit so as to update the correction information. Note that specific methods for the interpolation process or the function approximation process are not limited particularly. Arbitrary methods can be adopted.

As described above, in the correction information update process illustrated in FIG. 9 that is performed during an interval period, the controller 40 generates new correction information on the basis of at least the plurality of second images obtained by the microscope apparatus 10, and updates the correction information with the new correction information. More specifically, the controller 40 calculates at least a contrast value for each of the plurality of second images and calculates a combination between a correction information determination position and a setting of a correction device on the basis of the calculated contrast value, the combination being a combination with which a spherical aberration is corrected. It then generates new correction information on the basis of at least that combination and updates the correction information with the generated new correction information.

Figure 10:
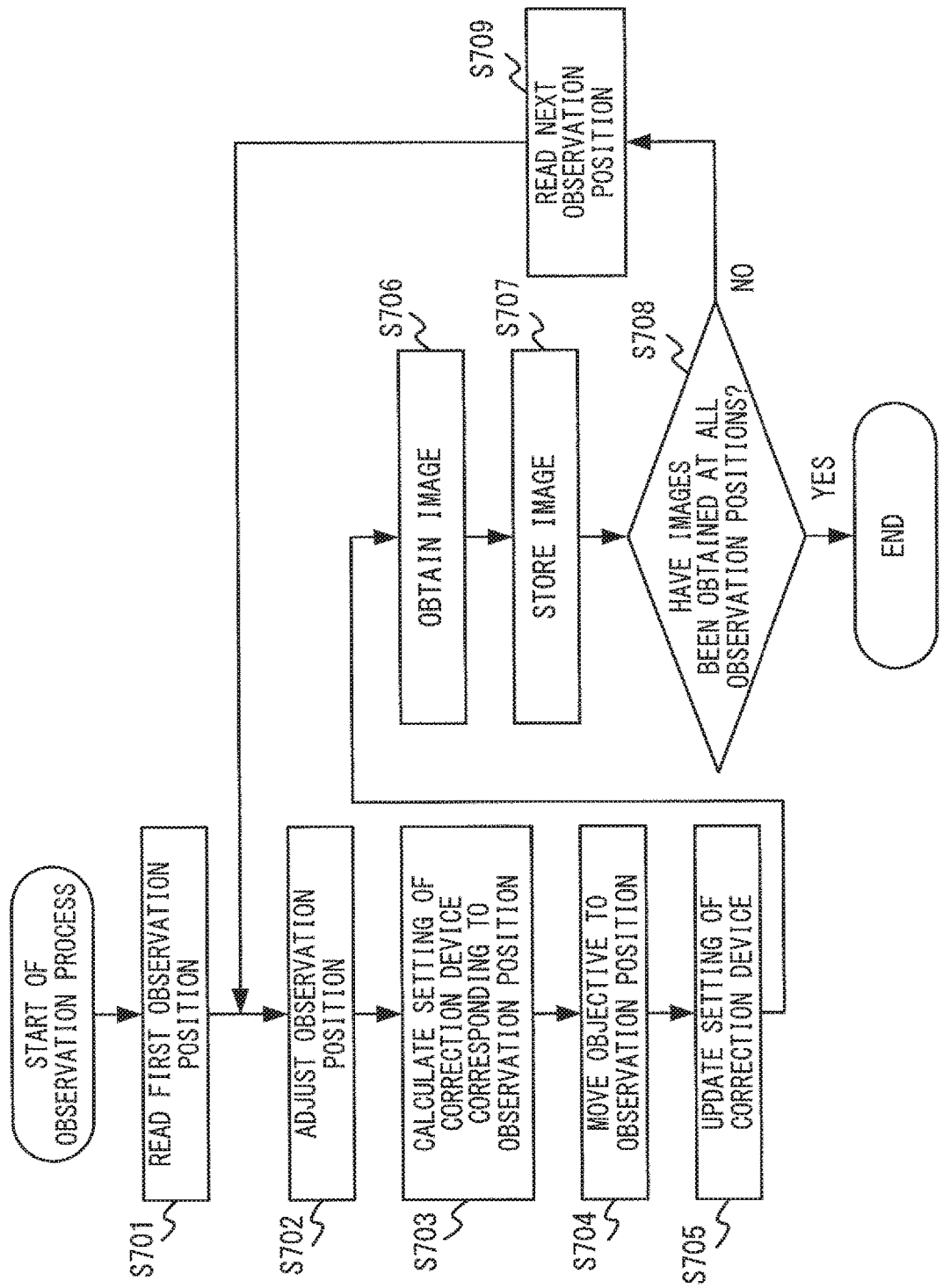
FIG. 10 is a flowchart illustrating an example of an observation process.

FIG. 10 is a flowchart illustrating an example of an observation process. When the observation process is started, the controller 40 first reads the first observation position as illustrated in FIG. 10 (step S701). In this process, the controller 40 reads one of the observation positions set as an observation condition in step S100 in FIG. 6.

Next, the controller 40 adjusts the observation position (step S702). In this process, the controller 40 adjusts the observation position on the basis of at least the variation information calculated in step S406, i.e., by the variation amount represented by the variation information, and stores the adjusted observation position in the storage unit. When the variation amount is positive, i.e., when the reference target position has moved in the positive direction, the adjustment is conducted by changing the observation position in the positive direction as well.

When the observation position is adjusted, the controller 40 calculates the setting of the correction device corresponding to the observation position (step S703). In this process, the controller 40 calculates the setting of the correction collar 23 corresponding to the observation position on the basis of the observation position adjusted in step S702 and the correction information updated in the correction information update process. Specifically, the controller 40 calculates the setting of the correction collar 23 by for example substituting the observation position for a function that is correction information.

When a setting is calculated, the controller 40 moves the objective 22 to the observation position (step S704), and updates the setting of the correction device (step S705). In this example, the controller 40 makes the focusing device 32 move the objective 22 to the observation position adjusted in step S702. Thereafter, the controller 40 makes the correction collar drive device 31 change the setting of the correction collar 23 to the setting calculated in step S703. Note that the order of performing the processes in step S704 and step S705 are not limited particularly. The process in step S705 may be performed prior to the process in step S704, and these processes may be performed in parallel in time.

Thereafter, the controller 40 instructs the microscope apparatus 10 to obtain an image (step S706), and stores (step S707) the image that the microscope apparatus 10 obtained in accordance with that instruction. The controller 40 then determines whether images have been obtained at all the observation positions stored in the storage unit (step S708). When images have not been obtained at all the observation positions, the controller 40 reads the next observation position (step S709), and repeats the processes from step S702 through step S708. When determining in step S708 that images have been obtained at all the observation positions, the controller 40 terminates the observation process.

As described above, in the observation process illustrated in FIG. 10 that is performed during an observation period, the controller 40 controls the correction collar 23 in accordance with correction information for each observation position, which is a position of the objective 22 determined on the basis of at least variation information.

As illustrated in FIG. 6 and FIG. 10, the microscope system 100 performs a reference target position detection process and a correction information update process described above during an interval period, and thereby can update correction information appropriately in response to changes over time occurring in sample S or the microscope apparatus 10. Also, by performing an observation process described above during an observation period, it is possible to calculate a setting of the correction collar 23 in response to the observation position from correction information that has been updated appropriately and to obtain an image of sample S at the calculated setting of the correction collar 23.

Accordingly, the microscope system 100 makes it possible to correct a spherical aberration satisfactorily even when change over time occurs in sample S or the microscope apparatus 10 in time-lapse observation. This makes it possible to obtain satisfactory images.

Figure 11:
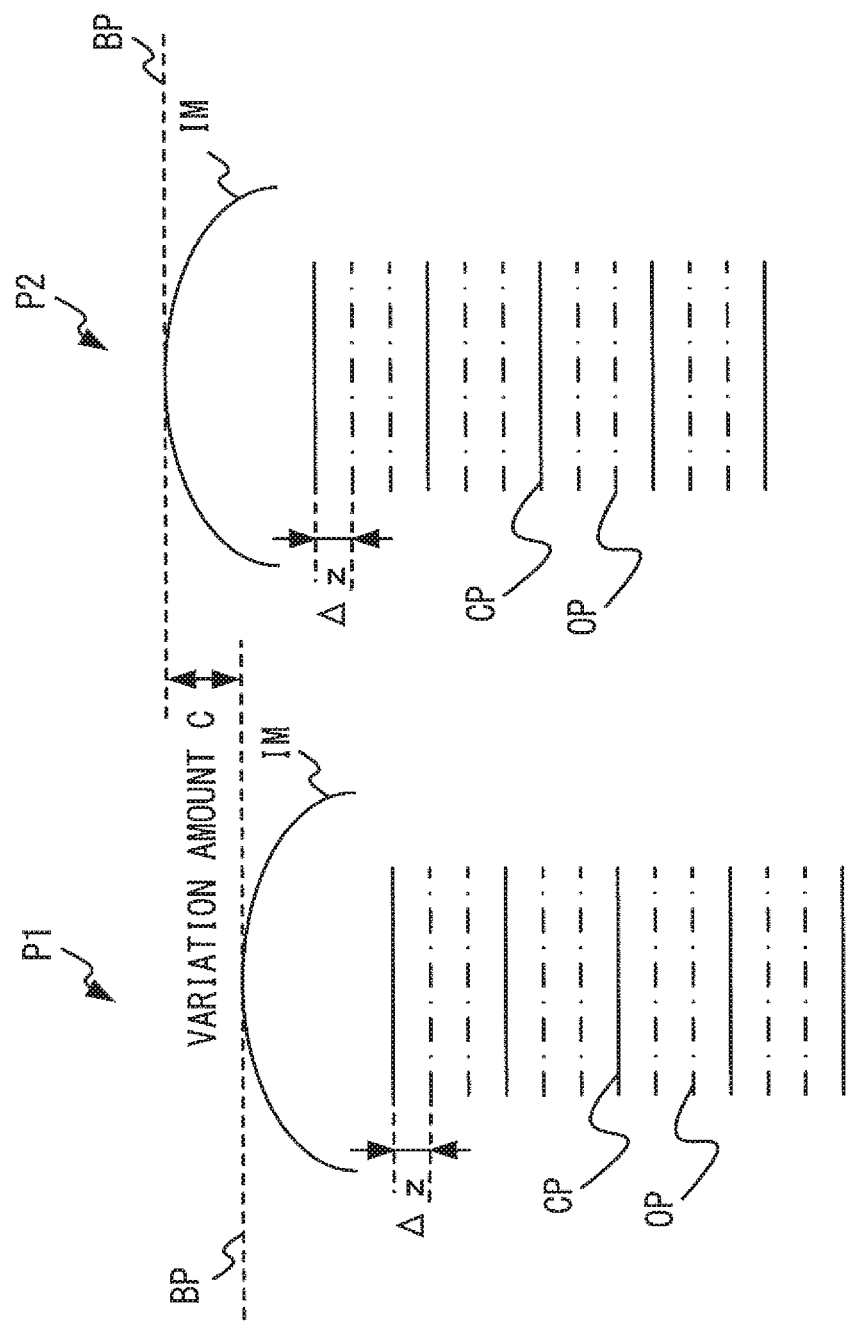
FIG. 11 explains adjustment of a correction information determination target position and an observation target position.

Further, even when reference target position BP changes during a time-lapse observation, the microscope system 100 adjusts a correction information determination position and an observation position on the basis of variation information representing variation amount C as illustrated in schematic diagrams P1 and P2 in FIG. 11, which depicts the states before and after such a change, and thereby the correction information determination target position CP and observation target position OP are offset. $\Delta z$ appearing in FIG. 11 denotes an interval between observation target positions.

Accordingly, correction information can be updated on the basis of information at an identical observation depth in each of the correction information update processes that are repeatedly conducted. This results in a stable condition for calculating correction information, making it possible to avoid a situation where the accuracy of correction information changes greatly each time the information is updated. Also, images at an identical observation depth can be obtained in each of the observation processes that are repeatedly conducted. Accordingly, the microscope system 100 makes it possible to continuously observe a fixed spot of sample S while correcting spherical aberrations with stable accuracy in time-lapse observation. This makes it possible to analyze sample S by using an image obtained through time-lapse observation easily and highly accurately.

Note that it is sufficient if the controller 40 of the microscope system 100 detects a reference target position during an interval period, and may also detect a reference target position through a process other than the reference target position detection process illustrated in FIG. 8. When for example cover glass CG is used, the controller 40 may first detect a surface that is closer to the objective 22 from among the surfaces of cover glass CG so as to detect, as a reference target position, a position that is shifted from the detected surface by the thicknesses of cover glass CG.

Figure 12:
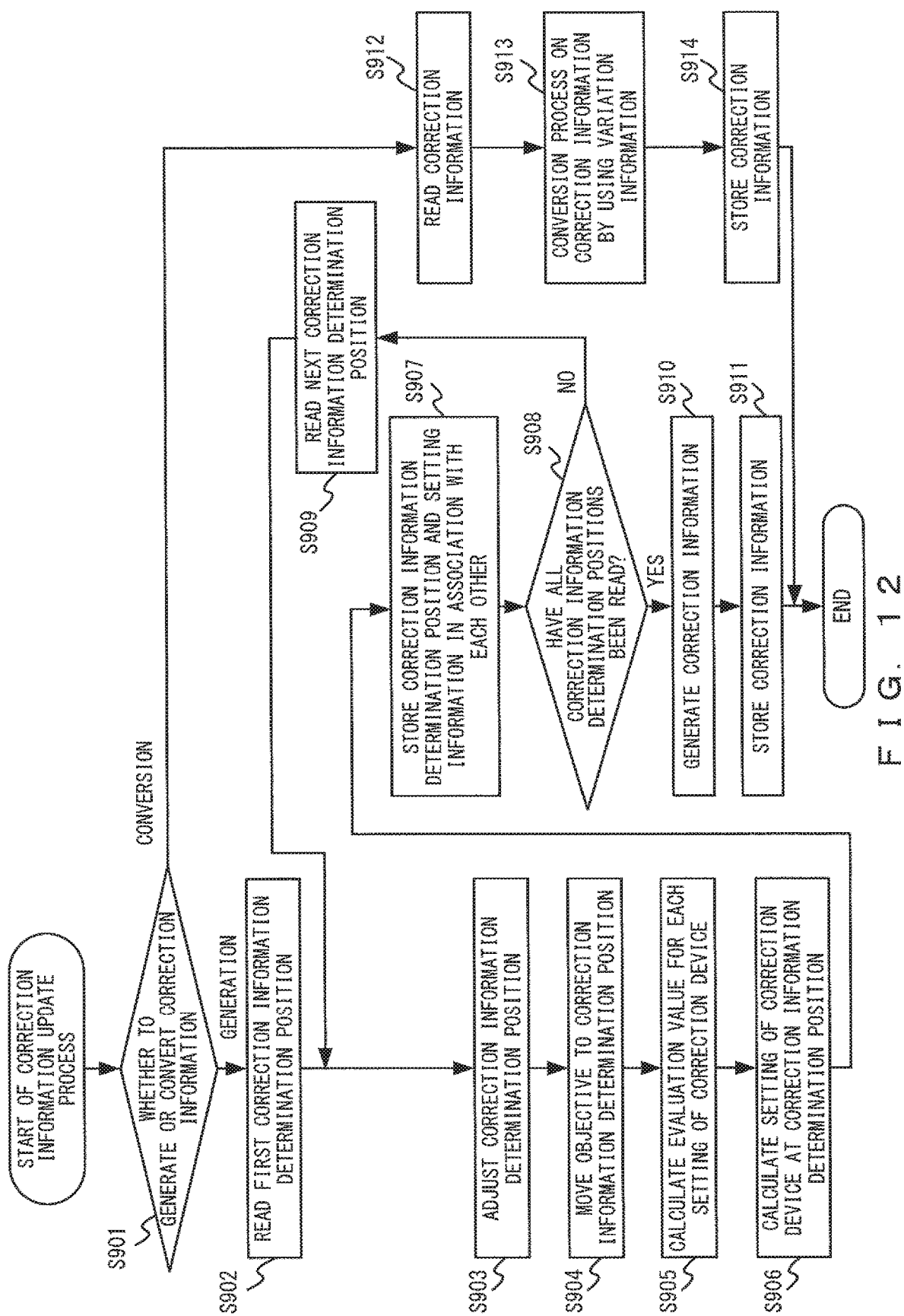
FIG. 12 is a flowchart illustrating another example of a correction information update process.

Also, it is sufficient if the controller 40 of the microscope system 100 updates correction information during an interval period, and may also perform the correction information update process illustrated in FIG. 12 instead of the correction information update process illustrated in FIG. 9.

FIG. 12 is a flowchart illustrating another example of a correction information update process. In the correction information update process illustrated in FIG. 12, the controller 40 first determines whether to generate new correction information or to convert correction information (step S901). In this process, the controller 40 may make the determination in accordance with for example the calculation method of correction information that was set as a correction information calculation condition in step S200. Also, a calculation method of correction information may be set for each correction information update process. For example, it may be set to convert correction information for odd-number-th correction information update processes and to generate new correction information for even-number-th correction information update processes. It may also be set to generate new correction information only for the first correction information update process and to convert correction information for second and subsequent correction information update processes.

When determining in step S901 to generate new correction information, the controller 40 performs the processes from step S902 through step S911. Note that the processes from step S902 through step S911 are similar to those from step S501 through step S510 in FIG. 9.

When, by contrast, determining in step S901 to convert correction information, the controller 40 first reads the existing correction information from the storage unit (step S912). Thereafter, the controller 40 performs, on the read correction information, a conversion process that uses variation information (step S913), so as to update the existing correction information with the correction information generated through the conversion process. In this process, the controller 40 calculates a new function and updates the existing function with the new function, the new function being calculated by for example translating, in the z direction by the variation amount represented by the variation information, the function for the position (z) of the objective 22 and the setting (θ) of the correction collar 23 that is correction information.

The microscope system 100 can satisfactorily correct a spherical aberration in time-lapse observations even when the correction information update process illustrated in FIG. 12 is performed instead of the correction information update process illustrated in FIG. 9. In particular, by increasing the number of times of performing a process of converting correction information in the correction information update process illustrated in FIG. 12, the number of times of obtaining images during an interval period can be reduced. In time-lapse observation, biological samples are often used as sample S. Therefore, the correction information update process illustrated in FIG. 12, by which damage to sample S can be suppressed by reducing the number of times of obtaining images, is one of the correction information update processes that are effective in time-lapse observation.

Also, it is sufficient if the microscope system 100 updates correction information during an interval period, and it is not always necessary for the microscope system 100 to update correction information for each interval period. Accordingly, the controller 40 of the microscope system 100 can perform the process of a time-lapse observation illustrated in FIG. 13 instead of the process of a time-lapse observation illustrated in FIG. 6.

Figure 13:
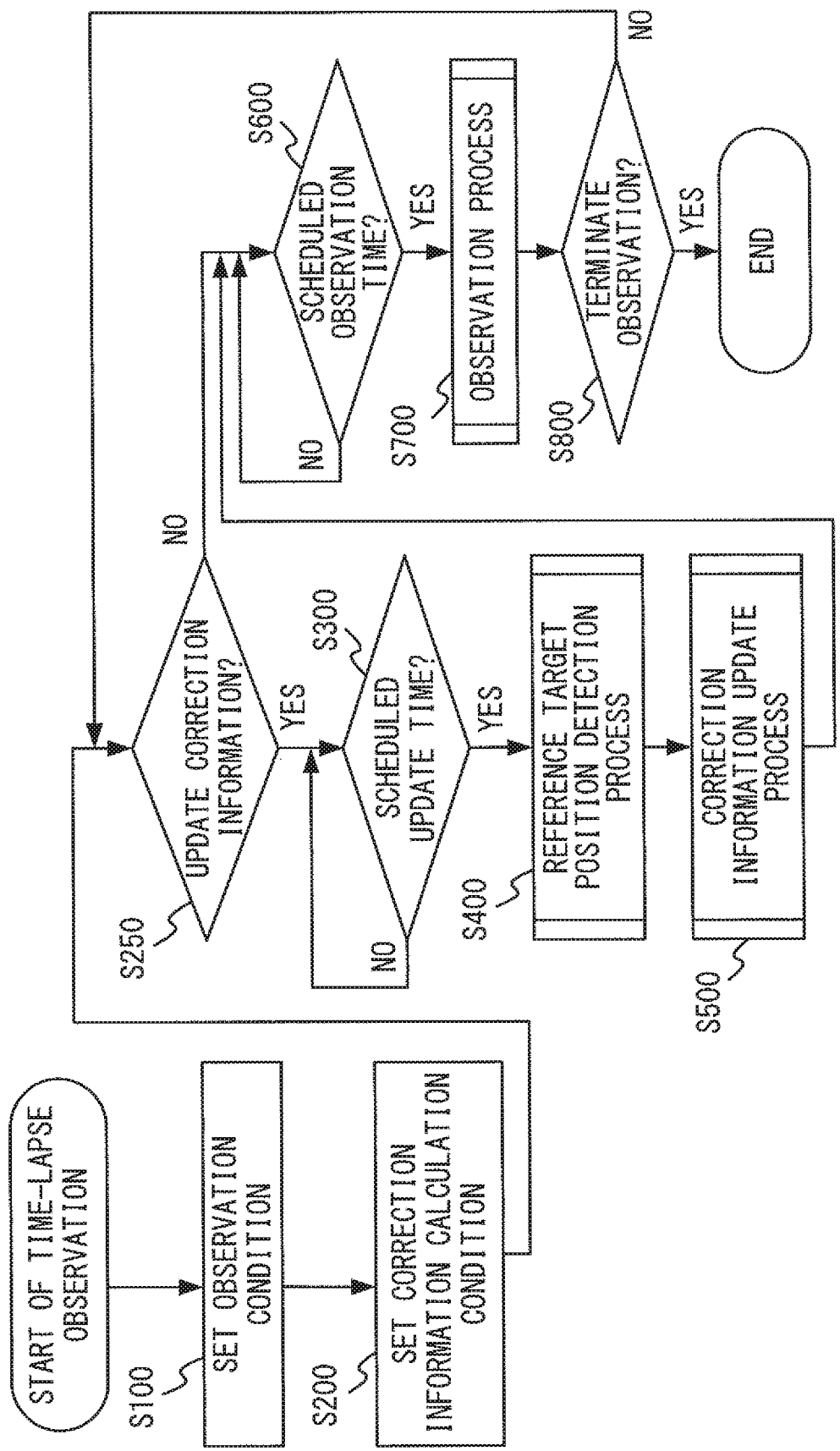
FIG. 13 is a flowchart illustrating another example of a time-lapse observation.

FIG. 13 is a flowchart of another example of a time-lapse observation. The process in FIG. 13 is different from the process in FIG. 6 in that it has, between step S200 and step S300, a process in which the controller 40 determines whether to update correction information (step S250).

In step S250, the controller 40 may make a determination on the basis of for example information set in step S200 as correction information calculation condition. In such a case, a configuration may be employed in which information specifying a timing to update correction information is set in advance as correction information calculation condition in step S200 and whether to update correction information is determined on the basis of that information in step S250. In step S200, the information may be set so that for example a process of updating correction information is performed once every prescribed number of times.

When determining in step S250 to update correction information, the controller 40 performs the processes from step S300 through step S800. When determining in step S250 not to update correction information by contrast, the controller 40 skips the processes from step S300 through step S500 and performs the processes from step S600 through step S800.

Even when the process illustrated in FIG. 13 is performed instead of the process illustrated in FIG. 6, the microscope system 100 can satisfactorily correct a spherical aberration in time-lapse observations.

The above embodiment is a specific example provided to facilitate the understanding of the invention, and the embodiment of the present invention is not limited to such an example. Various modifications and alterations can be made to the microscope system, the control method and the storage medium without departing from the descriptions of the claims.

While the correction collar 23 is exemplified as a correction device in the above embodiment, the correction device is not limited to the correction collar 23. Any correction device can be used as long as it can change the amount of a spherical aberration occurring on an optical path. The correction device may also be for example a device that moves a lens that is a constituent of the optical system of the microscope apparatus 10 or may be a device that uses LCOS (Liquid crystal on silicon (trademark)), DFM (Deformable Mirror), a liquid lens, etc.

Also, in the above embodiment, an example is described in which the focusing device 32 moves the revolver 24 in the optical axis directions so that the position of the objective 22 (in more detail, a relative position of the objective 22 with respect to the set position of the stage 21) is changed. However, the position of the objective 22 may be changed by moving the stage 21 in the optical axis directions.

Also, in the above embodiment, an example is described in which a single observation target scope is observed in time-lapse observation, a plurality of observation target scopes that are different in the directions orthogonal to the optical axis of the objective 22 may be observed in time-lapse observation. In such a case, it is desirable that the microscope system 100 be provided with an electric stage that operates in accordance with instructions from the controller 40. In such a case, it is desirable that the controller 40 store correction information in the storage unit for each observation target position, perform a reference target position detection process and a correction information update process for each observation target scope during an interval period, and perform a observation process during an observation period for each observation target scope. In other words, the controller 40 may control the correction collar 23 for each position of the objective 22 during an observation period on the basis of at least variation information and correction information for the observation target scope that corresponds to the field of view of the microscope apparatus 10.

What is claimed is:

1. A microscope system comprising:
   a microscope apparatus including an objective and a correction device that corrects a spherical aberration; and
   a controller that controls the microscope apparatus,
   wherein the controller, during an interval period of a time-lapse observation:
      detects a reference target position of an observation target, and
      updates correction information based on at least variation information, the correction information representing a relationship between a position of the objective and a setting of the correction device, and the variation information representing a variation amount of a distance from the objective to the reference target position,
   wherein the controller, during an observation period of the time-lapse observation, controls the correction device in accordance with the correction information for each position of the objective determined based on at least the variation information, and
   wherein at least a variation in the distance from the objective to the reference target position is caused by a temporal change in a sample occurring during a period of the time-lapse observation or by a temporal change in the microscope apparatus caused by heat applied during the period of the time-lapse observation.

2. The microscope system according to claim 1, wherein the controller, during the interval period:
   controls the microscope apparatus so that the microscope apparatus obtains a plurality of first images in a plurality of states with different positions of the objective, and
   detects the reference target position of the observation target based on at least the plurality of first images obtained by the microscope apparatus.

3. The microscope system according to claim 2, wherein the controller, during the interval period, detects the reference target position of the observation target based on at least a proportion of pixels having a luminance higher than a prescribed value, the proportion being calculated for each of the plurality of first images.

4. The microscope system according to claim 3, wherein the controller, during the interval period, detects the reference target position that is an interface closest to the objective from among interfaces of the observation target.

5. The microscope system according to claim 4, wherein the controller, during the interval period:
   adjusts a correction information determination position based on at least the variation information,
   controls the microscope apparatus so that the microscope apparatus obtains a plurality of second images in a plurality of states with different settings of the correction device when the position of the objective is identical to the correction information determination position,
   generates new correction information based on at least the plurality of second images obtained by the microscope apparatus, and
   updates the correction information with the new correction information.

6. The microscope system according to claim 3, wherein the controller, during the interval period:
   adjusts a correction information determination position based on at least the variation information,
   controls the microscope apparatus so that the microscope apparatus obtains a plurality of second images in a plurality of states with different settings of the correction device when the position of the objective is identical to the correction information determination position,
   generates new correction information based on at least the plurality of second images obtained by the microscope apparatus, and
   updates the correction information with the new correction information.

7. The microscope system according to claim 6, wherein the controller, during the interval period:
   calculates a combination based on at least a contrast value calculated for each of the plurality of second images, the combination being a combination between the correction information determination position and a setting of the correction device and being a combination with which spherical aberration is corrected, and
   generates the new correction information based on at least the combination.

8. The microscope system according to claim 2, wherein the controller, during the interval period, detects the reference target position that is an interface closest to the objective from among interfaces of the observation target.

9. The microscope system according to claim 8, wherein the controller, during the interval period:
   adjusts a correction information determination position based on at least the variation information,
   controls the microscope apparatus so that the microscope apparatus obtains a plurality of second images in a plurality of states with different settings of the correction device when the position of the objective is identical to the correction information determination position,
   generates new correction information based on at least the plurality of second images obtained by the microscope apparatus, and
   updates the correction information with the new correction information.

10. The microscope system according to claim 2, wherein the controller, during the interval period:
adjusts a correction information determination position based on at least the variation information,
controls the microscope apparatus so that the microscope apparatus obtains a plurality of second images in a plurality of states with different settings of the correction device when the position of the objective is identical to the correction information determination position,
generates new correction information based on at least the plurality of second images obtained by the microscope apparatus, and
updates the correction information with the new correction information.

11. The microscope system according to claim 10, wherein the controller, during the interval period:
calculates a combination based on at least a contrast value calculated for each of the plurality of second images, the combination being a combination between the correction information determination position and a setting of the correction device and being a combination with which spherical aberration is corrected, and
generates the new correction information based on at least the combination.

12. The microscope system according to claim 1, wherein the controller, during the interval period, detects the reference target position that is an interface closest to the objective from among interfaces of the observation target.

13. The microscope system according to claim 12, wherein the controller, during the interval period:
adjusts a correction information determination position based on at least the variation information,
controls the microscope apparatus so that the microscope apparatus obtains a plurality of second images in a plurality of states with different settings of the correction device when the position of the objective is identical to the correction information determination position,
generates new correction information based on at least the plurality of second images obtained by the microscope apparatus, and
updates the correction information with the new correction information.

14. The microscope system according to claim 1, wherein the controller, during the interval period:
adjusts a correction information determination position based on at least the variation information,
controls the microscope apparatus so that the microscope apparatus obtains a plurality of second images in a plurality of states with different settings of the correction device when the position of the objective is identical to the correction information determination position,
generates new correction information based on at least the plurality of second images obtained by the microscope apparatus, and
updates the correction information with the new correction information.

15. The microscope system according to claim 14, wherein the controller, during the interval period:
calculates a combination based on at least a contrast value calculated for each of the plurality of second images, the combination being a combination between the correction information determination position and a setting of the correction device and being a combination with which spherical aberration is corrected, and
generates the new correction information based on at least the combination.

16. The microscope system according to claim 1, wherein the controller, during the interval period:
performs a conversion process on the correction information by using the variation information, and
updates the correction information to correction information generated through the conversion performed by the conversion process.

17. The microscope system according to claim 1, wherein the controller:
includes a storage unit that records the correction information for each of a plurality of observation target scopes that are different from each other in directions that are orthogonal to an optical axis of the objective, and
controls the correction device for each position of the objective during the observation period based on at least the variation information and the correction information, the correction information being for an observation target scope corresponding to a field of view of the microscope apparatus from among the plurality of observation target scopes.

18. The microscope system according to claim 1, wherein the correction device comprises a correction collar of the objective.

19. A control method comprising:
during an interval period of a time-lapse observation:
detecting a reference target position of an observation target; and
updating correction information based on at least variation information, the correction information representing a relationship between a position of an objective and a setting of a correction device that corrects a spherical aberration, and the variation information representing a variation amount of a distance from the objective to the reference target position, and
during an observation period of the time-lapse observation:
controlling the correction device for each position of the objective based on at least the variation information and the correction information,
wherein at least a variation in the distance from the objective to the reference target position is caused by a temporal change in a sample occurring during a period of the time-lapse observation or by a temporal change in the microscope apparatus caused by heat applied during the period of the time-lapse observation.

20. A non-transitory storage medium having stored therein a program stored thereon for causing a controller for controlling a microscope apparatus to execute processes comprising:
during an interval period of a time-lapse observation:
detecting a reference target position of an observation target; and
updating correction information based on at least variation information, the correction information representing a relationship between a position of an objective and a setting of a correction device that corrects a spherical aberration, and the variation information representing a variation amount of a distance from the objective to the reference target position, and during an observation period of the time-lapse observation:
controlling the correction device for each position of the objective based on at least the variation information and the correction information,
wherein at least a variation in the distance from the objective to the reference target position is caused by a temporal change in a sample occurring during a period of the time-lapse observation or by a temporal change in the microscope apparatus caused by heat applied during the period of the time-lapse observation.

21. A microscope system comprising:
a microscope apparatus including an objective and a correction device that corrects a spherical aberration; and
a controller that controls the microscope apparatus,
wherein the controller, during an interval period of a time-lapse observation:
controls the microscope apparatus so that the microscope apparatus obtains a plurality of first images in a plurality of states with different positions of the objective,
detects a reference target position of an observation target based on at least a proportion of pixels having a luminance higher than a prescribed value, the proportion being calculated for each of the plurality of first images obtained by the microscope apparatus, and
updates correction information based on at least variation information, the correction information representing a relationship between a position of the objective and a setting of the correction device, and the variation information representing a variation amount of a distance from the objective to the reference target position, and
wherein the controller, during an observation period of the time-lapse observation, controls the correction device in accordance with the correction information for each position of the objective determined based on at least the variation information.

22. The microscope system according to claim 21, wherein the controller, during the interval period, detects the reference target position that is an interface closest to the objective from among interfaces of the observation target.

23. A microscope system comprising:
a microscope apparatus including an objective and a correction device that corrects a spherical aberration; and
a controller that controls the microscope apparatus,
wherein the controller, during an interval period of a time-lapse observation:
detects a reference target position of an observation target,
updates correction information based on at least variation information, the correction information representing a relationship between a position of the objective and a setting of the correction device, and the variation information representing a variation amount of a distance from the objective to the reference target position,
adjusts a correction information determination position based on at least the variation information,
controls the microscope apparatus so that the microscope apparatus obtains a plurality of second images in a plurality of states with different settings of the correction device when the position of the objective is identical to the correction information determination position,
generates new correction information based on at least the plurality of second images obtained by the microscope apparatus, and
updates the correction information with the new correction information, and
wherein the controller, during an observation period of the time-lapse observation, controls the correction device in accordance with the correction information for each position of the objective determined based on at least the variation information.

24. The microscope system according to claim 23, wherein the controller, during the interval period:
calculates a combination based on at least a contrast value calculated for each of the plurality of second images, the combination being a combination between the correction information determination position and a setting of the correction device and being a combination with which spherical aberration is corrected, and
generates the new correction information based on at least the combination.

25. The microscope system according to claim 23, wherein the controller, during the interval period, detects the reference target position that is an interface closest to the objective from among interfaces of the observation target.

26. The microscope system according to claim 23, wherein the controller:
calculates, for each of plurality of correction information determination positions, settings of the correction device at the correction information determination position at which the spherical aberration is corrected based on the plurality of second images, and
performs an interpolation process or a function approximation process on a plurality of combinations between the correction information determination positions and the settings of the correction device to calculate a function of a position of the objective and a setting of the correction device.

27. A microscope system comprising:
a microscope apparatus including an objective and a correction device that corrects a spherical aberration; and
a controller that controls the microscope apparatus,
wherein the controller, during an interval period of a time-lapse observation:
detects a reference target position of an observation target,
updates correction information based on at least variation information, the correction information representing a relationship between a position of the objective and a setting of the correction device, and the variation information representing a variation amount of a distance from the objective to the reference target position,
performs a conversion process on the correction information by using the variation information, and
updates the correction information to correction information generated through the conversion performed by the conversion process, and
wherein the controller, during an observation period of the time-lapse observation, controls the correction device in accordance with the correction information for each position of the objective determined based on at least the variation information.

* * * * *